Figure 1:
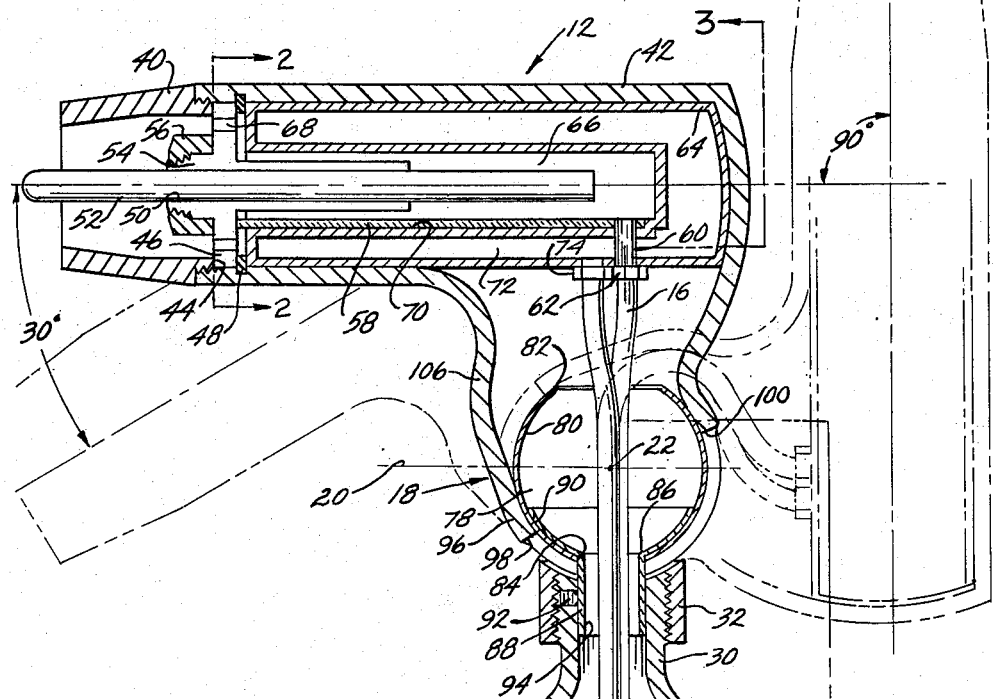

Nov. 5, 1963  J. E. KILBURN ETAL  3,109,916
ADJUSTABLE HEAD WELDING TORCH
Filed Aug. 3, 1960  2 Sheets-Sheet 1

INVENTORS
JOHN E. KILBURN
FRANCIS MORRONE
BY Teller & McCormick

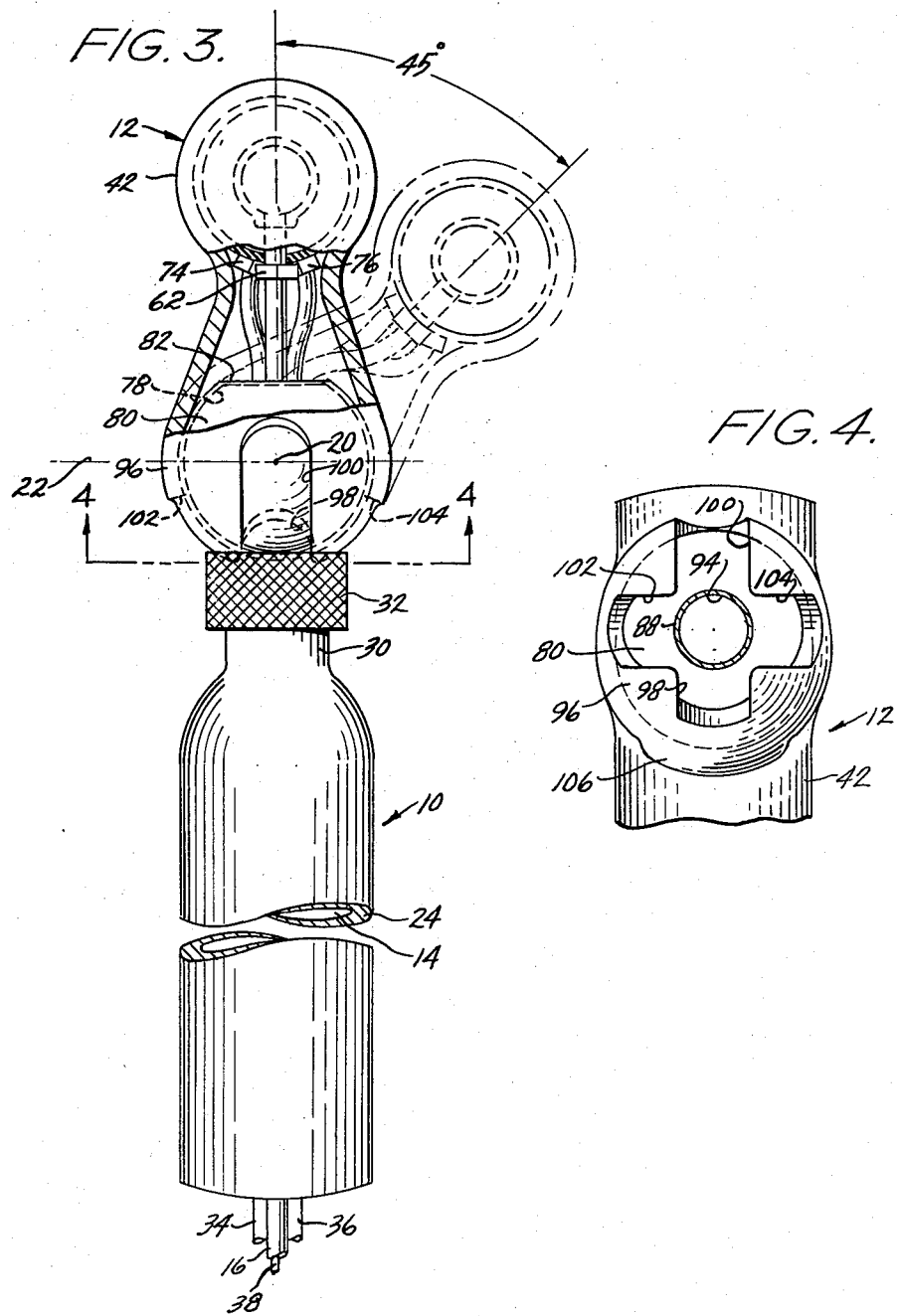

United States Patent Office 3,109,916
Patented Nov. 5, 1963

3,109,916
ADJUSTABLE HEAD WELDING TORCH
John E. Kilburn and Francis Morrone, East Hartford, Conn., assignors to International Tool & Research, Inc., West Hartford, Conn., a corporation of Connecticut
Filed Aug. 3, 1960, Ser. No. 47,180
12 Claims. (Cl. 219—75)

This invention relates to welding torches and, more particularly, to welding torches of the general type which include a handle and an adjustably connected head the latter of which requires a supply of fluid. In one well-known welding torch of this general type, a nonconsumable electrode is provided in the head of the torch and an inert gas is supplied to the head for "shielding" a workpiece or for other purposes.

The advantages obtained in providing adjustable head welding torches with greater maneuverability and utility are apparent and various types of adjustable head torches have heretofore been provided. However, a completely satisfactory adjustable head welding torch of the general type mentioned has not been provided. The necessity of connecting one or more gas or fluid carrying conduits to the torch head has, in general, resulted in relatively complex and/or cumbersome and unwieldy adjustable joints or connections between the handles and heads of such torches. In some known constructions, a comparatively wide range of head adjustments has been provided for, but this has resulted in very complex adjustable joints or connections between the torch handle and head. In other known constructions, undesirable complexity of the adjustable joint or connection has been overcome, but this has only been accomplished at the expense of a substantial loss in the range or degree of adjustability of the head.

It is the general object of the present invention to provide a welding torch of the general type referred to and which features a desirably simple adjustable joint between the torch handle and the head, the said joint being adapted for the complete enclosure and concealment of gas or other fluid carrying conduits leading to the head and yet accommodating a greater range or degree of head adjustment than has heretofore been obtainable.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Figure 2:
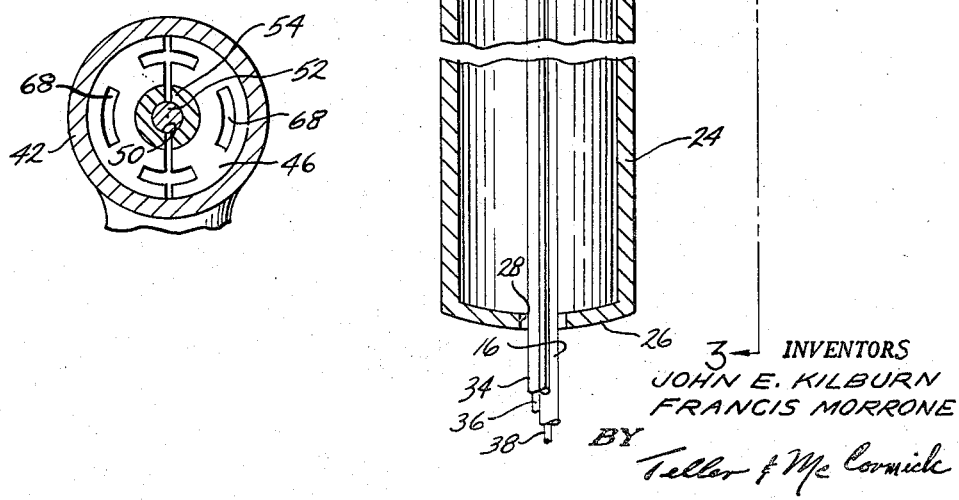

Of the drawing:
FIG. 1 is a longitudinal section of an adjustable head welding torch embodying the invention;
FIG. 2 is a fragmentary section taken on a radial plane through the head of the torch as indicated by the line 2—2 in FIG. 1;
FIG. 3 is a rear elevation of the torch of FIG. 1 partially in section as indicated generally by the line 3—3 in FIG. 1; and
FIG. 4 is a radial section taken at the inner end of the torch handle as indicated generally by the line 4—4 in FIG. 3.

Generally speaking, the welding torch of the present invention comprises an elongated handle as indicated generally at 10 in FIG. 1 and an elongated head as indicated generally at 12 in FIG. 1. The handle 10 and the head 12 are arranged with their longitudinal center lines at right angles when the head is adjusted to a normal or conventional position as shown in full line. A longitudinal passageway 14 through the handle 10 slidably receives at least one flexible fluid carrying conduit such as a conduit 16 shown in FIG. 1 and said conduit is connectible with the head 12 or, more specifically, the conduit 16 is connectible with means within the head 12 as will be described. A ball-socket type adjustable connecting means, as indicated generally at 18, disposed between the handle 10 and the head 12 provides for pivotal adjustment of the head relative to the handle about at least two discrete axes normal to the longitudinal center line of the handle. More specifically in the embodiment of the invention shown, the head 12 is pivotally adjustable about perpendicular first and second axes 20 and 22 both of which are normal to the longitudinal center line of the handle 10 and the former of which is parallel to the longitudinal line of the head 12. A wide range of head adjustment is thus provided for and as will be seen, the conduit 16, as well as similar additional conduits, is completely enclosed and concealed within the handle 10 and the connecting means 18 in all adjusted positions of the head 12.

Turning now to the details of construction of the welding torch shown, it will be observed that the handle 10 is of hollow cylindrical or tubular configuration. The aforementioned longitudinal passageway 14 through the handle is defined by the internal surface of a side wall 24 thereof, by the internal surface of an outer end wall 26, and by the wall of an axially extending circular opening 28 in said end wall. An inner end portion 30 of the handle 10 is of reduced diameter and is provided with external threads for engagement with mating internal threads on a nut 32. The inner end surface of the reduced diameter portion 30 of the handle is preferably concave outwardly as shown and the inner end surface of the nut 32 is preferably of similar shape. Said nut 32 constitutes a locking device for the ball-socket type connecting means 18 as will be described more fully hereinafter.

It will be observed that the aforementioned flexible fluid carrying conduit 16 has two similar flexible conduits 34 and 36 associated therewith. The conduits 34 and 36 extend adjacent the conduit 16 in and through the handle passageway 14 and are similarly slidably received therein. The welding torch shown is of the type utilized in welding ferrous and nonferrous materials wherein an inert gas is utilized for shielding the work area and preventing oxidation and/or contamination thereof. Thus, the conduit 16 constitutes a supply conduit for an inert gas. The flexible conduits 34 and 36 respectively constitute supply and return conduits for a coolant such as water which is employed in the head 12 in a manner to be described. A flexible electrical conductor 38 also extends through the handle passageway 14 and is slidable therewithin. Said conductor is shown disposed within the gas supply conduit 16, but such location of the conductor is optional.

In preferred form, the head 12 of the welding torch comprises a front or nozzle portion 40 and a rear or body portion 42. Each of said portions 40 and 42 of the head 12 are generally cylindrical and hollow in form and they are preferably threadedly connected together as shown at the rear end portion of the nozzle 40 and the front end portion of the body 42. The rear end surface of the nozzle 40 constitutes a rearwardly facing annular shoulder 44 which projects radially inwardly within the front end portion of the body 44. A peripheral portion of a collet 46 is held between said shoulder 44 and a snap ring 48 entered in a suitable annular groove in the body portion 42 of the head 12.

As best shown in FIG. 2, the collet 46 is of a conventional split type and has a central axial bore 50 adapted to receive an elongated electrode 52 (FIG. 1) which may be of tungsten or other suitable material. Said collet supports the electrode 52 longitudinally or axially within the head 12 with the front end portion thereof projecting from the front end or nozzle portion 40 of the head so as to be presented to a workpiece. A tapered threaded nose section 54 of the collet 46 receives a nut 56 which serves to contract the two parts of the collet about an electrode in the bore 50 to securely hold the electrode in place.

In accordance with the presently preferred practice electrical power is supplied to the electrode 52 through electrically conductive means in the head 12. Said means comprise the collet 46, a bus bar 58, and an electrical conductor not shown disposed within a short length of conduit 60. Said conductor is conventionally connected with the bus bar 58 and with the aforementioned flexible electrical conductor 38 disposed within the gas supply conduit 16, the said conduit 16 being connected with the short length of conduit 60 by means of a suitable connector 62.

The head 12 of the welding torch also includes means defining a passageway for supplying inert gas to the area adjacent the front or working end portion of the electrode 52 and an adjacent workpiece. In preferred form, said means comprises a case 64 which is held within the body 42 of the head 12 by means of the aforementioned snap ring 48 and which defines a cylindrical gas chamber 66 which receives the rear end portion of the electrode 52. The short conduit 60 receives inert gas from the flexible gas supply conduit 16 and supplies the same to the gas chamber 66 wherein it flows forwardly and through a plurality of slots 68, 68 in the collet 46. Thus, the gas is delivered to the working end of the electrode 52 and the workpiece for fulfillment of its "shielding" function. The aforementioned bus bar 58 is supported within an elongated groove 70 in a wall of the gas chamber 66 and is connected at opposite ends to the collet 46 and the conductor within the conduit 60 as mentioned.

The case 64 within the head 12 of the welding torch preferably also defines a coolant chamber 72 within the body portion 42 of said head. As shown, the chamber 72 has an annular front portion which extends adjacent and around the gas chamber 66 and said coolant chamber also has a cylindrical rear portion which lies adjacent the rear end portion of the gas chamber 66. It will be apparent that a suitable coolant such as water may be circulated through the chamber 72 to receive and dissipate heat generated by the electrode 52 and transmitted to the coolant chamber by inert gas passing through the gas chamber 66. A measure of cooling is also provided by the passage of the inert gas over the electrode 52 in the chamber 66. Circulation of the coolant through the chamber 72 is accomplished by connection of the aforementioned coolant supply and return conduits 34 and 36 with said chamber. Small connectors 74 and 76 respectively connect said conduits with the case 64 for communication with the chamber 72.

The aforementioned ball socket type connecting means 18 between the handle 10 and the head 12 of the welding torch may take a wide variety of forms within the scope of the invention, but in all forms provision is made for the concealed passage of at least one flexible conduit through said means. In the preferred embodiment of the invention shown, the three flexible conduits 16, 34 and 36 and the flexible electrical conductor 38 extend through the connecting means 18. More specifically, said conduits and conductor extend through and are slidable within a passageway 78 in a ball-like element 80 of the connecting means. The construction of the element 80 may vary widely but as shown and as presently preferred, said element takes the form of a generally spherical shell. Diametrically opposed inner and outer circular openings 82 and 84 are formed in the shell and the common axis of said openings is coincident with the longitudinal center line of the handle 10 of the welding torch. Thus, the passageway 78 may be said to be aligned with the passageway 14 in the handle 10. Said passageway 78 is defined by the internal surface of the shell 80 and has inner and outer ends constituted by the inner and outer openings 82 and 84. The diameter of the inner opening 82 is larger than that of the outer opening 84 and is somewhat critical as will be seen.

The ball-like element or shell 80 is preferably fixedly connected with and supported by the inner end portion of the handle 10 of the welding torch and, as shown, a separate connector 86 is provided for securing the said element or shell to said handle end portion. In preferred form, the connector 80 is a hollow generally trumpet shaped member having a tubular or hollow cylindrical body portion 88 and a parti-spherical bell portion 90 formed integrally therewith. The body portion 88 is entered in the inner end portion 30 of the handle 10 and is held securely as by means of a set screw 92. The ball portion 90 is disposed in spaced relationship with the inner end surface of the handle 10 and within the ball-like element or shell 80 in engagement with a portion of the internal surface thereof. The outer opening 84 in the said shell receives the body portion 88 of the connector 86 and said body portion in turn slidably receives the conduits 16, 34 and 36 and the conductor 38 in a passageway 94 therewithin, the said passageway 94 being aligned longitudinally with the aforementioned handle passageway 14 and the shell passageway 78.

The socket element 96 of the ball-socket connecting means 18 may also vary widely in construction, but said element preferably takes the form of a parti-spherical integral extension of the rear portion of the body 42 of the welding torch head 12. In accordance with the invention, the element or extension 96 at least partially envelops the shell 80, continuously encloses the conduits 16, 34 and 36 and the conductor 38, and is rotatable about said shell to permit the head 12 to be adjusted pivotally about two discrete axes normal to the longitudinal center line of the handle 10. As mentioned above, the head 12 is pivotally adjustable about the perpendicular axes 20 and 22 in the embodiment of the invention shown. That is, the said head may be swung forwardly and rearwardly about the axis 22 and from side to side about the axis 20. As shown, the socket element or head extension 96 substantially envelops the shell 80 and said element is provided with slots which receive the body portion 94 of the connector 86 to permit rotation of the element about the shell.

A front slot 98 in the element 96 receives the connector body portion 88 to permit the head 12 to be swung forwardly about the axis 22 or toward the handle 10 of the torch. The slot 98 is arcuate with the curvature of the element 96 and extends generally inwardly from a point adjacent the said connector body portion 88. The width of the slot is of course sufficient to receive the said body portion 88 and the length thereof is sufficient to permit the head 12 to be swung forwardly or toward the handle 10 through an angle of approximately 30° as indicated.

A rear slot 100 in the parti-spherical socket element 96 receives the connector body portion 88 when the head 12 of the welding torch is swung rearwardly about the axis 22. Said slot 100 is of sufficient length to permit the head 12 to be swung through approximately 90° about the axis 22 to a broken line position indicated in FIG. 1 wherein the longitudinal center line of the head is parallel with the longitudinal center line of handle 10.

As best shown in FIGS. 3 and 4, similar arcuate side slots 102 and 104 extend generally inwardly in the element 96 from the area adjacent the body portion 88 of the connector 86. Said side slots 102 and 104 are each of sufficient length to provide for sideways swinging movement of the head 12 about the axis 20 through an angle of approximately 45° from a central position of the head.

From the foregoing it will be apparent that the head 12 may be pivotally adjusted about the axes 20 and 22, and it will be further apparent that the said head can be held in adjusted positions by means of the aforementioned locking nut 32. The nut 32 may be turned outwardly on the handle portion 30 to permit free movement of the socket element 96 about the shell 80. When the head has been pivotally adjusted to a desired position, the nut may be turned inwardly along said handle portion to engage the inner portion of said socket element and urge the same into binding engagement with the inner portion of the shell 80, the said shell being urged, in turn, into binding engagement with the bell portion 90 of the connector 86. Only a slight hand pressure is required to tighten the nut 32 in locking position and the said nut is therefore preferably provided with a knurled cylindrical outer surface as best shown in FIG. 3.

As mentioned above, the size or diameter of the inner opening 82 in the shell 80 is somewhat critical. On the one hand, it is necessary that the opening 82 be as small as possible so that the said opening may be readily enclosed by the socket element 96 in all pivotally adjusted positions of the head 12. On the other hand, the said opening must be large enough to avoid sharp bending and crimping of the conduits 16, 34 and 36 and the electrical conductor 38 when the head is adjusted to its terminal positions such as the straight line position shown in broken line in FIG. 1. In the welding torch shown, both of these requirements are met. The inner end portions of each of the slots in the socket element 96 are disposed outwardly of the inner end of the shell 80 and the opening 82 therein in all adjusted positions of the head 12, the said opening 82 thus being enclosed at all times. The conduits 16, 34 and 36 and the conductor 38 are in fact bent about the edge portions of the shell 80 adjacent the opening 82, but the bend angles are sufficiently shallow to prevent crimping or excessive wear of the conduits and the conductor. The said conduits and conductor slide freely within the handle passageway 14, the connector passageway 94, and the shell passageway 78 during adjustment of the head.

In FIGS. 1 and 4 it will be observed that a forwardly projecting enlargement 106 is provided at a front portion of the parti-spherical socket element or head extension 96. When the head 12 is pivoted rearwardly to the straight line position shown in FIG. 1, the enlargement 106 serves to provide additional free space sufficient for the flexible conduits 16, 34 and 36 and the flexible conductor 38 adjacent the inner end of the shell 80. Thus, a wide range of adjustability of the head 12 is provided for together with complete enclosure and concealment of the flexible conduits and conductor in all adjusted portions of the head.

The invention claimed is:

1. An adjustable head welding torch comprising an elongated handle having a longitudinal passageway therethrough, a flexible electrical conductor and at least one flexible gas supply conduit slidably disposed in said passageway, an elongated head with its longitudinal center line substantially normal to the longitudinal center line of said handle, an elongated electrode and means supporting the same longitudinally within said head with its front end portion projecting from the front end portion thereof, electrically conductive means in the head connectible with said flexible conductor and said electrode, means defining a passageway in said head connectible with said flexible gas supply conduit and adapted to supply gas to an area adjacent said projecting end portion of said electrode, a ball-like element provided with a passageway aligned with said handle passageway for slidably receiving said flexible conductor and flexible conduit, a connector fixedly securing said ball-like element in spaced relationship with the inner end portion of said handle, said connector being provided with a passageway aligned with said passageways in said handle and ball-like element for slidably receiving said flexible conductor and conduit, a parti-spherical socket element on a rear portion of said head constructed and arranged so as to cooperate with said ball-like element to continously enclose said conductor and conduit and so as to engage and substantially envelop said ball-like element, said socket element being provided with arcuate front and rear slots and with at least one arcuate side slot all of which slots extend generally inwardly from an area adjacent said connector, said front and rear slots and said side slot serving to receive a portion of said connector and to permit said socket element to be rotated about said ball-like element to pivotally adjust said head respectively about substantially perpendicular first and second axes both of which are normal to said handle center line and one of which is parallel to said head center line, and a locking nut threadedly connected with an inner end portion of said handle and engageable with said socket element to urge the same into binding engagement with said ball-like element whereby to hold the head in adjusted position relative to the handle.

2. An adjustable head welding torch as set forth in claim 1 wherein said ball-like element takes the form of a substantially spherical shell provided with diametrically opposed inner and outer circular openings which form the inner and outer ends of the said passageway through the shell.

3. An adjustable head welding torch as set forth in claim 2 wherein said connector takes the form of a hollow trumpet-shaped member with a tubular body portion connected with the inner end portion of the handle and a parti-spherical bell portion disposed within said shell and in engagement with a portion of the internal surface of the shell.

4. An adjustable head welding torch as set forth in claim 3 wherein the length of said rear slot in said socket element is sufficient to permit the head to be swung rearwardly about the other of said first and second axes through approximately 90° to a position wherein the center lines of said handle and head are substantially parallel.

5. An adjustable head welding torch as set forth in claim 4 wherein the length of said front slot in said socket element is sufficient to permit the head to be swung forwardly about said other axis through approximately 30° so that the center lines of said handle and head form an acute angle.

6. An adjustable head welding torch as set forth in claim 5 wherein said socket element is provided with two side slots each of sufficient length to permit the head to be swung sideways about said one axis through an angle of approximately 45° from a central position of the head wherein the center lines of the handle and head lie in a common plane.

7. An adjustable head welding torch as set forth in claim 6 wherein said circular inner opening is of such diameter that the opening is enclosed by said socket element in all adjusted positions of said head.

8. An adjustable head welding torch as set forth in claim 7 wherein said socket element is provided with a forwardly projecting enlargement at a front portion thereof, said enlargement serving to provide sufficient space for said flexible conductor and conduit adjacent the inner opening of said shell when said head is swung rearwardly through 90° whereby to avoid sharp bending and crimping of said conductor and conduit.

9. An adjustable head welding torch as set forth in claim 8 wherein flexible supply and return coolant conduits are provided and extend adjacent said flexible conductor and said flexible gas conduit through said handle passageway and said connector and shell passageways to said head, and wherein said head includes means defining a coolant chamber connectible with said coolant conduits and adapted to receive heat generated by said electrode.

10. A welding torch comprising an elongated head, a flexible conduit connectible with the head, an elongated handle with its longitudinal center line substantially normal to the longitudinal center line of the head and provided with a longitudinal passageway for slidably receiving said conduit, a ball-like element provided with a passageway aligned with said handle passageway for slidably receiving said flexible conduit, a connector securing said ball-like element in spaced relationship with the inner end portion of said handle, said connector being provided with a passageway aligned with said passageways in said handle and ball-like element for slidably receiving said flexible conduit, a parti-spherical socket element on a rear portion of said head constructed and arranged so as to cooperate with said ball-like element to continuously enclose said conduit and so as to engage and substantially envelop said ball-like element, said socket element being provided with arcuate front and rear slots and with at least one arcuate side slot all of which slots extend generally inwardly from an area adacent said connector, and said front and rear slots and said side slot serving to receive a portion of said connector and to permit said socket element to be rotated about said ball-like element to pivotally adjust said head respectively about substantially perpendicular first and second axes both of which are normal to said handle center line and one of which is parallel to said head center line.

11. A welding torch comprising an elongated head member, a flexible conduit connected to said head member, an elongated handle member provided with a longitudinal passageway for receiving said conduit, a parti-spherical ball-like element provided with a passageway for slidably receiving said flexible conduit, a generally parti-spherical socket element constructed and arranged to engage and substantially envelop said ball-like element, means connecting said ball-like element with one of the said members, and said socket element having a connection with the other of said members, said socket element being provided with at least one arcuate slot which extends from an area adjacent said connecting means and which is adapted to receive a portion of said connecting means to permit said socket element to be rotated about said ball-like element to pivotally adjust said head about at least one axis normal to the center line of said handle.

12. A welding torch comprising a head member, a flexible conduit connected with said head member, an elongated handle member provided with a longitudinal passageway for receiving said flexible conduit, a ball element having a parti-spherical external surface and provided with an opening for receiving said flexible conduit, means connecting said ball element to one of said members and which means includes a tubular part extending outwardly from said parti-spherical surface and between said parti-spherical surface and said one member so as to space said parti-spherical surface from said one member, the bore of said part being in communication with the opening in said ball member and providing a passageway for receiving said conduit, a socket element which substantially envelops said ball element, said socket element being connected with the other of said members and having a parti-spherical internal surface engageable and concentric with said parti-spherical surface of said ball element and also having a parti-spherical external surface concentric with said internal surface, said socket element also having a slot therein for receiving said tubular part and which slot is elongated to permit said socket element to be rotated relative to said ball element and said part to angularly adjust said head relative to said handle, means defining a parti-spherical clamping surface on said one member surrounding said tubular part and disposed adjacent said external parti-spherical surface of said socket member, and means for moving said clamping surface into and out of tight engagement with said external parti-spherical surface for releasably holding said head in any selected position of adjustment relative to said handle.

References Cited in the file of this patent
UNITED STATES PATENTS
1,460,697  Bendlin _____ July 3, 1923